United States Patent Office 2,914,578
Patented Nov. 24, 1959

2,914,578

PROCESS FOR PREPARING ORGANO SODIUM COMPOUNDS

John F. Nobis and Robert E. Robinson, Cincinnati, Ohio, assignors to National Distillers and Chemical Corporation, New York, N.Y., a corporation of Virginia No Drawing. Application December 28, 1956
Serial No. 631,029

7 Claims. (Cl. 260—665)

This invention relates generally to an improved method for the preparation of organo alkali metal compounds and more particularly, to an improved method for preparation of organosodium compounds.

It has been discovered that organo alkali metal compounds and especially organo sodium compounds can be produced conveniently and readily by reaction of alkali metal dispersions of controlled and critical particle size and distribution ranges with the appropriate organic halide.

The general reaction of an alkali metal with an organic halide to give the corresponding organo alkali metal compound is well known and can be carried out in a number of ways and employing varying modifications. However, all these known reactions and processes using alkali metals are subject to a number of disadvantages and difficulties, especially when carried out on commercial or semi-commercial scale.

For example, in many cases upon the contacting of a so-called "normal" sodium dispersion with the other reactant, the organic halide, such as the alkyl or aryl halide, the reaction will not initiate or even once initiated will proceed at an extremely sluggish rate for relatively long periods of time of ½ hour up to an hour or longer. In some cases, which are completely unpredictable, the reaction will initiate in 5 to 10 minutes with substantially shorter induction periods. In other cases, the reactions, even after initiation, are erratic and difficult to control and give only 40–50% yields.

In order to avoid these induction difficulties, a variety of solutions have been tried. Among these are use of substantial excesses of one or more of the reactants, and, in particular, the alkali metal reactant, variations in temperatures of operation, use of excessive amounts of dispersing agents, cumbersome mechanical means such as scratching and shaking, attrition apparatus, and the like. Among specific methods which have been tried for initiation and control of reactions in which so called "normal" sodium dispersions are one of the principal reactants, is the presence in the newly charged reaction vessel of about 5–20% of the previous reaction charge. Thus, on large scale operations, or in continuous or semi-continuous operations, the reaction vessel is not completely emptied and cleaned from one run to another. However, this is a disadvantage in many reactions where there are certain by-products and small amounts of impurities in the reactants, which unless purged or removed completely from the reaction vessel, build-up and cause continued contamination of products as well as other problems in the reaction vessel during the course of further operations. This is particularly troublesome when carrying out continuous or semi-continuous processes since it results in a progressive build-up of impurities, which must be purged.

For instance, it has previously been reported that phenylsodium may be prepared from chlorobenzene and sodium in nearly quantitative yields when dispersed sodium with sodium particles in the range of 10–30 microns is used. However, in all these cases a 10 to 20% stoichiometric excess of sodium, over the chlorobenzene used, was required to obtain maximum yields of the desired product.

It has now been found that nearly theoretical yields of organosodium compounds can be obtained with no use of excess sodium by employing a dispersion having extremely fine particles (average particle size of 1 to 2 microns). It also has been observed that the induction periods and attendant difficulties noted with "normal" sodium dispersions as described and used in the prior art do not occur with these fine dispersions; i.e., initiation of the reaction of an organic halide with fine sodium dispersions is instantaneous and the reaction proceeds smoothly to completion.

These fine sodium dispersions have been found useful for reactions with alkyl, cycloalkyl, aryl, aralkyl, alkaryl, and heterocyclic chlorides in the formation of organosodium compounds. The reaction between these fine sodium dispersions and the organic halide compound is immediate and no induction period is noted even though the dispersion has been prepared as long as a week prior to use. Previous work has shown that minimum induction periods and maximum yield occur only when the dispersion is freshly prepared and at least some substantial excess of sodium is employed.

One suitable method for carrying out the reaction produces a dispersion or solution of the alkali metal alkyl, cycloalkyl, aryl, aralkyl, alkaryl, or heterocyclic in a solvent or diluent which is inert to the organo alkali compound. An appropriate one should be selected if the alkali metal compound is to be used for further reactions later. This can be done by initially dispersing the alkali metal, for instance, sodium, in the selected reaction medium and adding thereto the appropriate alkyl, cycloalkyl, aryl or other derivatives, such as the appropriate chloride. It is also possible to use other organic halides instead of the chloride.

The alkali metals which can be used in the improved process are all of those of the chemical group and especially lithium, sodium, and potassium. For economic reasons and availability, sodium is preferred.

The organo alkali metal compounds which can be prepared by the herein described new process include but are not limited to methylsodium, ethylsodium, ethyllithium, isopropylsodium, vinylsodium, isopropylpotassium, n-propylsodium, n-butylsodium, isobutylsodium, isobutyllithium, isobutylpotassium, amyllithium, n-amylsodium, n-hexylsodium, n-octylsodium, n-octyllithium, isooctylsodium, octyllithium, n-nonylsodium, decylsodium, n-undecylsodium, n-dodecylsodium, n-hexadecylsodium, phenyllithium, phenylpotassium, phenylsodium, o-tolylsodium, m-tolylsodium, p-tolylsodium, mixed tolylsodium, B-sodioethylbenzene, 2,5-disodiofuran, disodionaphthalene, alkylnapththylsodium, p-(t-butyl)phenylsodium, p-(isopropyl)phenylsodium, naphthylsodium, naphthyllithium, diphenylmethylsodium, and the like.

The process is not limited to the preparation of alkali metal hydrocarbons since organo alkali metal compounds having groups other than those made up solely of carbon and hydrogen can also be prepared. It is only necessary that such other groups not be reactive under the conditions with the alkali metal dispersion or with the alkali metal product.

The reaction is carried out either in batch, semi-continuous, or continuous operations. It is especially well suited to continuous operations since induction periods and erratic operation have been eliminated by the improved invention described herein. Most conveniently, and in the preferred embodiments, the process is carried out in a diluent or liquid reaction medium, the amount not being unduly critical, but it should be at least sufficient to permit effective agitation. Organic solvents and/or diluents of the organic hydrocarbon class such as petroleum ether, pentane, cyclopentane, the hexanes, cyclohexanes, heptane, mineral spirits, petroleum hydrocarbons, benzene, xylenes, toluene, and mixtures of these materials can be used. It is preferred that the material used be free of impurities which may tend to react with either the organic halide, the alkali metal, or the resulting organo alkali metal product, that is, materials such as water, alcohols, ethers, and unsaturates should be preferably absent.

The temperature for the reaction is not unduly critical. Temperatures in the range of —40° to +40° C. can be employed satisfactorily depending somewhat on the particular halide used.

Generally speaking, the process embodied herein comprises an improvement in preparing organo alkali metal compounds by using an alkali metal in dispersed form in which more than about 30% of the alkali metal particles are of less than about five microns in size, and more particularly, not more than about three microns in size.

More preferably, the improved process embodied herein is carried out by use of the alkali metal in the form of a dispersion in which more than about 30% of the alkali metal particles are of less than about five microns in size, and more preferably, not over about three microns, and the average particle size of the dispersion is not more than about ten microns. In a still more preferred embodiment, the invention is carried out by use of the alkali metal in the form of a dispersion in which (a) more than about 30% of the alkali metal particles do not exceed about three microns in size, (b) the average particle size of the dispersion averages not more than about one micron and (c) the dispersion is devoid of more than about 10% of alkali metal particles larger than about fifteen microns in size. Optimum results are generally obtained by use of an alkali metal dispersion in which all or substantially all of the alkali metal particles do not exceed about three microns in size and the average particle size is less than 1 micron in diameter.

In preparation of the alkali metal dispersion, it is desirable to employ at least one or more dispersing agents capable of promoting rapid and complete breakdown of the gross sodium particles. Choice of these dispersing aids is important, although a number of different selected materials can be used. Aluminum stearate and copper oleate as well as other selected metallic soaps have also been found to function quite satisfactorily. For optimum flow characteristics of the dispersion, other materials can also be used either alone or in combinations. Dispersing aids which are useful include dimer acid (dimerized linoleic acid), oleic acid, aluminum stearate, aluminum octanoate, calcium stearate, aluminum laurate, lead naphthenate, zinc stearate and other metallic soaps as well as lecithin, and dispersed polymers, rubbers, resins, and the like.

As a typical method for preparation of dispersions suitable for practice of this improvement invention, an inert (non-reactive) hydrocarbon or other inert (non-reactive) diluent is placed in a suitable vessel with the appropriate amount of alkali metal (sodium), suitable materials useful as the inert diluent such as dibutyl ether, n-octane, isooctane, toluene, xylene, naphthalene, n-heptane, straight run kerosene, etc. The mixture is then heated in a surrounding bath or otherwise until the sodium has melted (M.P. 97.5° C.). A suitable high speed agitator is then started and, preferably, an emulsifier consisting, for example of ½% (based on sodium) of the dimer of linoleic acid is added. After a short period of agitation, a dispersion of sodium particles in the range of 5–15 microns is normally obtained (i.e., normal dispersions).

A suitable mill, such as a homogenizer, is preheated by placing a small amount of inert hydrocarbon (e.g., mineral spirits) in the retention pot and running the mill until the liquid reaches a temperature in the range of 105–115° C. When such a temperature has been reached, the above described preformed "normal dispersion" is added to the retention pot while the mill is continued in operation. Preferably, the vehicle for the dispersion and the small amount used for pre-heating the homogenizer mill are calibrated and accounted for so that a sodium concentration of from about 10% to about 60%, and preferably 20–50%, is maintained for preparation of final finished dispersions of high stability and maximum reactivity. Thus, a reactivity similar to a solution of sodium is approached. The selective dispersing aid or aids that are employed can be incorporated by adding only a portion of the total amount thereof to the mixture while forming the "normal dispersion" and adding the remainder to the initial diluent charge in the homogenizer mill prior to addition thereto of the "normal dispersion." On the other hand, all of the dispersing aids can be added to the preformed dispersion before its addition to the homogenizer equipment. By such a two-step process, the normal dispersions can be converted to dispersions in which the maximum size of the particles of sodium do not exceed about 3 microns with an average micron size of 1 and less and which, for purposes herein are designated as the "fine dispersions" utilized in describing specific embodiments of the invention. For preparation of such dispersions, other dispersion units, including those of the ultrasonic type, may be used and which operate successfully with either a preformed dispersion or molten sodium as feed.

In order to further describe the invention, the tabulation in Table I sets forth physical characteristics of alkali metal dispersions which consisted of a normal dispersion itself, a fine dispersion (30% sodium) prepared substantially as aforedescribed in mineral spirits, and controlled mixtures of such dispersions, the particle size characteristics of which were determined by visual examination with a microscope having a calibrated eyepiece. The present invention is concerned with dispersions corresponding to a composition containing at least 50% or more by weight of "fine dispersions" of the sodium.

TABLE I

| Percent Sodium Dispersion | | Average Particle size | Percent of Particles of 5 or less Microns | Percent of Particles over 15 Microns |
|---|---|---|---|---|
| Fine Dispersion | Normal Dispersion | | | |
| Average = 1 micron. Maximum particle size = 3 microns. | Average = 12 microns. Maximum Particle size = 30 microns. Particles over 15 microns = not more than 10%. Particles of 5 microns or below = not more than 10%. | | | |
|  | 100 | 12 | not more than 10 | not more than 10 |
| 50 | 50 | 6 | 50–55 | 5.0 |
| 100 |  | 1 | 100 | 0 |

Organo alkali metal compounds as the term is used herein includes alkyl, cycloalkyl, aryl, aralkyl, alkaryl and heterocyclic alkali metal derivatives and especially those derived from sodium. These compounds have a wide variety of uses in laboratory and commercial applications. For instance, they can be used as catalytic agents for dimerizations, polymerizations, condensations and the like, for carrying out metalation reactions, as in metathetical reactions involving replacement of sodium with another metal or a non-metal or with an organic radical. These organo alkali metal compounds have found special utility as polymerization catalysts for use in processes of polymerization as is described for example in copending application S.N. 608,209, filed September 6, 1956.

The aryl and aralkyl sodium compounds such as phenylsodium, benzylsodium, naphthylsodium, and the like are valuable chemical intermediates of commercial importance. They can also be used, for example, as metalating agents to transfer the sodium atom to other molecules. They are employed for instance in the manufacture of modified antibiotics, and in the production of the barbiturate drugs. They find use in manufacture of other intermediates and can ultimately be used in preparation of such products as antispasmodics, antiseptics, anticoagulants, perfumes, fumigants, fungicides, herbicides, insecticides, and insect and animal repellants.

A typical commercially useful synthesis in which the improvements of this invention find applicability is in the following synthesis using chlorobenzene. The chlorobenzene is initially reacted with finely dispered sodium in toluene. This reaction gives a substantially quantitative yield of phenylsodium. The phenylsodium is directly and immediately thereafter quantitatively converted to benzylsodium by the metalation of an equimolar portion of the toluene reaction medium. The resulting benzylsodium is carbonated under selective and critical conditions to give either a relatively high yield of phenylmalonic acid with only a minor portion of phenylacetic acid, or to give a substantially quantitative yield of phenylacetic acid.

In carrying out this synthesis successfully, it is initially necessary to prepare phenylsodium from chlorobenzene and finely dispersed sodium. These materials are reacted together at a temperature of 0 to 40° C. and preferably about 25 to 30° C. in a reaction medium consisting solely of toluene. This results in the quantitative formation of phenylsodium.

In the past the sodium which was reacted with the chlorobenzene was used in dispersed form as a 10–20% dispersion in toluene. Furthermore, the dispersion has to be freshly prepared to avoid troublesome induction periods and initiation difficulties. The average particle size of the sodium particles in the "normal" type dispersion is below 25 microns but over 10 microns. Using these normal dispersions an excess of sodium of about 10–20% based on the stoichiometric amount is required. However, using this improved method with the fine dispersions of controlled and critically defined particle size characteristics, there is no induction or initiation period. Furthermore, there is no necessity for the use of any excess of sodium, since complete reaction is accomplished with stoichiometric amounts of reactants.

A number of examples are shown hereinafter as typical embodiments of the process of the invention although it is in no way intended to limit the invention specifically thereto. All parts are by weight unless otherwise indicated.

*Example 1*

To 54 parts of dispersed sodium which is 17.4% excess over the stoichiometric amount (about 12 to 25 micron particle size average) suspended in 275 parts of toluene at 25–30° C. in a stirred kettle is added, with gentle agitation, 10–15 parts of a mixture of 112.6 parts of chlorobenzene and 100 parts of toluene. Initiation of reaction is observed to start on standing about one to five minutes after this addition is started and is characterized by a temperature rise and the appearance of black phenylsodium particles. After the reaction is well started, the additional amount of chlorobenzene in toluene is added at such a rate as to keep the reaction temperature below 35° C. The reaction vessel is preferably immersed in a cooling bath during this addition. The rate of addition and the temperature of the cooling bath may be regulated so that the formation of the phenylsodium will be complete in 20 to 30 minutes. The exothermic reaction usually ceases abruptly when the last of the chlorobenzene has been added. Carbonation of the reaction mixture on Dry Ice and isolation of the benzoic acid shows a yield of 95% based on chlorobenzene.

*Example 2*

The reaction conditions of Example 1 were used except that stoichiometric quantities of chlorobenzene and sodium were used and the dispersed sodium was especially prepared so that it had a particle size average of 1 micron and no particles were larger than 3 microns. Initiation of reaction between sodium and chlorobenzene was immediate and the chlorobenzene could be added as rapidly as heat was removed from the exothermic reaction mixture indicating that the sodium was being consumed immediately and no insoluble coating formed on the surface of the sodium particle to hinder its reaction. The yield of benzoic acid was 97% after carbonation and isolation of the product.

*Example 3*

To prepare a so-called fine dispersion which is typical of the fine dispersions especially suitable for use in the process of this invention, an appropriate amount of sodium necessary to prepare a total of 10.1 parts of a 40% sodium dispersion was placed together with the appropriate amount of mineral spirits (B.P. 170–190° C.) in a suitable vessel equipped for agitation. The vessel and its contents together with 0.5% each of dimerized linoleic acid and copper oleate as dispersing aids were heated until the sodium melted. A suitable high speed agitator was started. After a short period of agitation, a dispersion of sodium particles in the range of 5–15 microns was normally obtained (i.e., normal dispersions). This dispersion was then placed in a preheated homogenizer mill and the mill operated for a period of time to the normal dispersion to a dispersion in which the maximum size of the particles of sodium did not exceed about 3 microns with an average micron size of 1 and less (fine dispersion).

A dry reactor kettle was charged with 50 parts of anhydrous mineral spirits. Under an atmosphere of argon, the 10.1 parts of the 40% sodium dispersion resulting from the above preparation was added thereto. To the agitated dispersion there was added 5.6 parts of n-butyl chloride, the rate of addition being controlled so as to maintain the temperature below 35° C. The reaction started immediately. After addition was complete the mixture was stirred for an additional period of time to assure complete conversion of reactants to n-butylsodium although no further evidence of reactions was noted after addition of the n-butylchloride was complete. The yield was determined by carbonation of an aliquot as 85% of theoretical.

*Example 4*

To 27 parts of sodium dispersed (17.4% excess, 12 micron particle size average) in 40.5 parts of isooctane there was added 202.5 parts of n-pentane so that the resulting concentration of sodium was 10% by weight. n-Butyl chloride (46.3 parts) in 150 parts of normal pentane was added slowly to the sodium dispersion. At the onset of addition there was an immediate color change and temperature rise. The reaction temperature was held at 0° during the 25 minute addition. Reaction continued for 15 minutes and at the end of this time the n-butylsodium was carbonated on Dry Ice. Isolation of the acid product showed a 65.6% yield of valeric acid.

*Example 5* n-Butylsodium was prepared in the same manner as indicated in Example 4 above except that a fine sodium dispersion (1 micron particle size average, maximum 3 microns) was used. No excess of sodium was present and the yield of valeric acid was 75%.

*Example 6* n-Amylsodium was prepared in the manner described in Example 4 above. To 38.5 parts of sodium (11.6% excess) (12 micron particle size average) dispersed in 153 parts of n-octane (20% dispersion) was slowly added 80 parts n-amylchloride in 80 parts n-octane. Although there was initially no apparent temperature rise, the reaction mixture began to darken slowly. Gradually the temperature began to rise from 0° C. The reaction temperature was controlled at 0° to −10° C. for the remainder of the 35 minute addition period. The reaction was allowed to warm slowly to room temperature over a 30 minute period and the n-amylsodium was then carbonated by pouring on Dry Ice. Isolation of the acid product showed a 59.3% yield of caproic acid.

*Example 7* n-Amylsodium was prepared in the same manner as described in Example 6 except that a "fine sodium dispersion" (1 micron particle size average, maximum 3 microns) was used. Usage of excess of sodium was omitted and the yield of caproic acid was observed to be 72%.

*Example 8*

A similar method as employed in Examples 4 and 6 was used to prepare m-tolylsodium. To 27 parts of sodium (17.4% excess dispersed in 207 parts n-octane as an 11.5% dispersion having a 12 micron average particle size was slowly added 63.3 parts of m-chlorotoluene diluted with 63.3 parts of n-octane. Within 3 minutes a gradual temperature rise was noted. The temperature was maintained at 25–30° C. during the 20 minute addition period. Although there was still some apparent reaction continuing at the end of a second 20 minute period, $CO_2$ gas was admitted to the reaction mixture at 0° for 30 minutes to effect carbonation. Isolation and recrystallization gave a yield of 73.5% m-toluic acid.

*Example 9* m-Tolylsodium was prepared in the same manner as shown in Example 8 except that a "fine dispersion" (1 micron particle size average, maximum 3 microns) was used. No excess of sodium was present and the yield of m-toluic acid was found to be 84.1%.

What is claimed is:

1. A process for preparation of organo sodium compounds which comprises reacting an organic halide in which the organic radical is selected from the group consisting of alkyl, cycloalkyl, aryl, aralkyl, alkaryl, and heterocyclic radicals with a substantially stoichiometric equivalent of sodium in dispersed form in the presence of an inert diluent and in which more than about 30% of the dispersed alkali metal particles are of less than about five microns in size, the average particle size of the dispersion is not more than about ten microns and the sodium dispersion is devoid of more than about 10% of sodium particles larger than about 15 microns size.

2. A process for preparation of organo sodium compounds which comprises reacting an organic chloride in which the organic radical is selected from the group consisting of alkyl, cycloalkyl, aryl, aralkyl, alkaryl, and heterocyclic radicals with a substantially stoichiometric equivalent amount of sodium in dispersed form in the presence of an inert diluent and in which (1) more than about 30% of the sodium particles do not exceed about three microns in size, (2) the average particle size of the sodium dispersion averages not more than about one micron, and (3) the sodium dispersion is devoid of more than about 10% of sodium particles larger than about 15 microns size.

3. A process for preparation of organo alkali metal compounds which comprises reacting an organic halide in which the organic radical is selected from the group consisting of alkyl, cycloalkyl, aryl, aralkyl, alkaryl, and heterocyclic radicals with a substantially equivalent amount of an alkali metal in dispersed form in the presence of an inert diluent and in which (1) more than about 30% of the alkali metal particles do not exceed about three microns in size, (2) the average particle size of the alkali metal dispersion averages not more than about one micron, and (3) the sodium dispersion is devoid of more than about 10% of sodium particles larger than about 15 microns size.

4. A process for preparation of alkyl alkali metal compounds which comprises reacting an alkyl halide with an alkali metal in dispersed form in which more than about 30% of the dispersed alkali metal particles of less than about five microns in size, the average particle size of the dispersion is not more than about ten microns and the sodium dispersion is devoid of more than about 10% of sodium particles larger than about 15 microns size.

5. A process for preparation of aryl alkali metal compounds which comprises reacting an aryl halide with an alkali metal in dispersed form in which more than about 30% of the dispersed alkali metal particles are of less than about five microns in size, the average particle size of the dispersion is not more than about ten microns and the sodium dispersion is devoid of more than about 10% of sodium particles larger than about 15 microns size.

6. A process for preparation of organo alkali metal compounds which comprises reacting an organic halide in which the organic radical is selected from the group consisting of alkyl, cycloalkyl, aryl, aralkyl, alkaryl, and heterocyclic radicals with an alkali metal in dispersed form in which more than about 30% of the dispersed alkali metal particles are of less than about five microns in size, the average particle size of the dispersion is not more than about ten microns, and the sodium dispersion is devoid of more than about 10% of sodium particles larger than about 15 microns size.

7. A process for preparation of organo alkali metal compounds which comprises reacting an organic chloride in which the organic radical is selected from the group consisting of alkyl, cycloalkyl, aryl, aralkyl, alkaryl, and heterocyclic radicals with sodium in dispersed form in which more than 30% of the sodium particles are of less than about five microns in size, the average particle size of the dispersion is not more than about ten microns, and the sodium dispersion is devoid of more than about 10% of sodium particles larger than about 15 microns size.

References Cited in the file of this patent

UNITED STATES PATENTS

| | | |
|---|---|---|
| 2,773,092 | Carley et al. | Dec. 4, 1956 |
| 2,795,626 | Nobis et al. | June 11, 1957 |
| 2,799,705 | De Pree | July 16, 1957 |

OTHER REFERENCES

Hansley: Indust. and Eng. Chem., vol. 43, No. 8, 1951, pp. 1759–1766 (pp. 1759 and 1760 only relied on).